United States Patent [19]

Narayan et al.

[11] Patent Number: 4,803,229

[45] Date of Patent: Feb. 7, 1989

[54] MODIFIED POLYISOCYANATE COMPOSITIONS AND MOLDED FLEXIBLE POLYURETHANE FOAM

[75] Inventors: Thirumurti Narayan, Grosse Ile; Edward R. Pray, Dearborn; John R. Stoll, Woodhaven, all of Mich.

[73] Assignee: BASF Corporation, Parsippany, N.J.

[21] Appl. No.: 816,400

[22] Filed: Jan. 6, 1986

[51] Int. Cl.$^4$ .............................................. C08G 18/79
[52] U.S. Cl. ...................................... 521/160; 528/67
[58] Field of Search ........................... 521/160; 528/67; 560/335

[56] References Cited

U.S. PATENT DOCUMENTS

| | | | |
|---|---|---|---|
| 3,124,605 | 3/1964 | Wagner | 521/162 |
| 3,492,251 | 1/1970 | Gemeinhardt | 521/160 |
| 3,526,652 | 9/1970 | Powers | 528/59 |
| 3,793,268 | 2/1974 | Dietrich et al. | 528/67 |
| 4,051,165 | 9/1977 | Wagner et al. | 560/335 |
| 4,221,877 | 9/1980 | Cuscurida et al. | 521/160 |

*Primary Examiner*—Veronica P. Hoke
*Attorney, Agent, or Firm*—William G. Conger

[57] ABSTRACT

Molded flexible polyurethane foam is prepared by reacting a polyol with a urea-biuret modified polyisocyanate mixture which is composed of toluene diisocyanate and polymeric diphenylmethane diisocyanate.

22 Claims, No Drawings

MODIFIED POLYISOCYANATE COMPOSITIONS AND MOLDED FLEXIBLE POLYURETHANE FOAM

BACKGROUND OF THE INVENTION

1. Field of the Invention

The present invention relates to a process for preparing molded flexible polyurethane foam and to the molded foam prepared thereby. More particularly, the invention relates to molded flexible polyurethane foam employing urea-biuret modified polyisocyanates.

2. Description of the Prior Art

U.S. Pat. No. 3,526,652 teaches the preparation of urea-biuret containing polyisocyanates by treating polyphenylene polymethylene polyisocyanate with about 0.1 percent to about 0.5 percent water at temperatures from about 100° C. to about 140° C. U.S. Pat. No. 3,936,483 teaches the use of a polyisocyanate mixture comprising from about 10 percent to about 90 percent toluene diisocyanate and the balance a mixture of polyphenylene polymethylene polyisocyanates. U.S. Pat. No. 4,221,877 teaches the preparation of biuret modified diphenylmethane diisocyanate by reacting from about 0.1 equivalent of water to about 0.3 equivalent of water per equivalent of diisocyanate. The prior art does not teach that molded flexible polyurethane foam with improved air flow and compression set may be prepared from a mixture of urea-biuret modified polyisocyanates.

SUMMARY OF THE INVENTION

The subject invention relates to a process for preparing molded flexible polyurethane foam which comprises reacting a polyol and a urea-biuret modified polyisocyanate mixture in the presence of a blowing agent and a urethane catalyst in a mold. The polyisocyanate mixture comprises toluene diisocyanate and polymeric diphenylmethane diisocyanate.

The reaction is preferably carried out as a oneshot process and may also be carried out in the presence of additives such as chain extenders and flame retardants.

The molded parts which are prepared according to the process of this invention have good mechanical properties with improved air flow and compression set.

DESCRIPTION OF THE PREFERRED EMBODIMENTS

In accordance with the invention molded flexible polyurethane foam is prepared employing a urea-biuret modified polyisocyanate mixture which is composed of toluene diisocyanate and polymeric diphenylmethane diisocyanate. Either the toluene diisocyanate or the polymeric diphenylmethane diisocyanate may be urea-biuret modified or both may be urea-biuret modified to form the mixture. The polyisocyanate may be urea-biuret modified by treatment either with water or t-butanol. The polyisocyanate mixture may contain from about 50 weight percent to about 90 weight percent based on the total weight of the polyisocyanate mixture. Preferably the polyisocyanate mixture contains about 80 weight percent toluene diisocyanate. The concentration of water or t-butanol which may be employed is from about 0.1 weight percent to about 2 weight percent based on the weight of the polyisocyanate. Preferably the amount of water or t-butanol is from about 0.2 weight percent to about 1 weight percent. The temperature of the reaction may range from about 70° C. to about 150° C., preferably from about 80° C. to about 135° C.

Representative polyols essentially free from ethylenic unsaturation which may be employed in the preparation of the flexible polyurethane foams are well known to those skilled in the art. They are often prepared by the catalytic condensation of an alkylene oxide or mixture of alkylene oxides either simultaneously or sequentially with an organic compound having at least two active hydrogen atoms, such as evidenced by U.S. Pat. Nos. 1,922,459; 3,190,927 and 3,346,557. Representative polyols include polyhydroxyl-containing polyesters, polyoxyalkylene polyether polyols, polyhydroxy-terminated polyurethane polymers, polyhydroxyl-containing phosphorus compounds, and alkylene oxide adducts of polyhydric polythioesters, polyacetals, aliphatic polyols and thiols, ammonia, and amines including aromatic, aliphatic, and heterocyclic amines, as well as mixtures thereof. Alkylene oxide adducts of compounds which contain 2 or more different group within the above-defined classes may also be used, for example, amino alcohols which contain an amino group and a hydroxyl group. Also, alkylene oxide adducts of compounds which contain one SH group and one OH group as well as those which contain an amino group and an SH group may be used. Generally, equivalent weight of the polyols will vary from 100 to 10,000, preferably from 1000 to 3000.

Any suitable hydroxy-terminated polyester may be used such as are prepared, for example, from polycarboxylic acids and polyhydric alcohols. Any suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, $\alpha$-hydromuconic acid, $\beta$-hydromuconic acid, $\alpha$-butyl-$\alpha$-ethyl-glutaric acid, $\alpha,\beta$-diethylsuccinic acid, isophthalic acid, terephthalic acid, hemimellitic acid, and 1,4-cyclohexanedicarboxylic acid. Any suitable polyhydric alcoho, including both aliphatic and aromatic, may be used such as ethylene glycol, propylene glycol, trimethylene glycol, 1,2-butanediol, 1,3-butanediol, 1,4-butanediol, 1,2-pentanediol, 1,4-pentanediol, 1,5-pentanediol, 1,6-hexanediol, 1,7-heptanediol, glycerol, 1,1,1-trimethylolpropane, 1,1,1-trimethylolethane, 1,2,6-hexanetriol, $\alpha$-methyl glucoside, pentaerythritol, and sorbitol. Also included within the term "polyhydric alcohol" are compounds derived from phenol such as 2,2-bis(4-hydroxyphenyl)propane, commonly known as Bisphen©l A.

The hydroxyl-containing polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl-containing polyester with only a portion of the components being a diamine such as ethylene diamine.

Any suitable polyoxyalkylene polyether polyol may be used such as the polymerization product of an alkylene oxide or a mixture of alkylene oxides with a polyhydric alcohol. Any suitable polyhydric alcohol may be used such as those disclosed above for use in the preparation of the hydroxy-terminated polyesters. Any suitable alkylene oxide may be used such as ethylene oxide, propylene oxide, butylene oxide, amylene oxide and mixtures of these oxides. The polyoxyalkylene polyether polyols may be prepared from other starting materials such as tetrahydrofuran and alkylene oxide-tetrahydrofuran mixtures; epihalo hydrins such as epichlorohydrin; as well as aralkylene oxides such as styrene oxide. The polyoxyalkylene polyether polyols may have either primary or secondary hydroxyl groups. Included among the polyether polyols are polyoxyethylene glycol, polyoxypropylene glycol, polyoxybutylene glycol, polytetramethylene glycol, block copolymers, for example, combinations of polyoxypropylene and polyoxyethylene glycols, poly-1,2-oxybutylene and polyoxyethylene glycols, poly-1,4-oxybutylene and polyoxyethylene glycols, and random copolymer glycols prepared from blends of two or more alkylene oxides or by the sequential addition of two or more alkylene oxides. The polyoxyalkylene polyether polyols may be prepared by any known process such as, for example, the process disclosed by Wurtz in 1859 and *Encyclopedia of Chemical Technology*, Vol. 7, pp. 257–262, published by Interscience publishers, Inc. (1951) or in U.S. Pat. No. 1,922,459. Polyethers which are preferred include the alkylene oxide addition products of trimethylolpropane, glycerine, pentaerythritol, sucrose, sorbitol, propylene glycol, and 2,2'-(4,4'-hydroxyphenyl)propane and blends thereof having equivalent weights of from 100 to 5000.

Suitable polyhydric polythioethers which may be condensed with alkylene oxides include the condensation product of thiodiglycol or the reaction product of a dicarboxylic acid such as is disclosed above for the preparation of the hYdroxYl-containing polyesters with any other suitable thioether glycol.

Polyhydroxyl-containing phosphorus compounds which may be used include those compounds disclosed in U.S. Pat. No. 3,639,542. Preferred polyhydroxyl-containing phosphorus compounds are prepared from alkylene oxides and acids of phosphorus having a $P_2O_5$ equivalency of from about 72 percent to about 95 percent.

Suitable polyacetals which may be condensed with alkylene oxides include the reaction product of formaldehyde or other suitable aldehyde with a dihydric alcohol or an alkylene oxide such as those disclosed above.

Suitable aliphatic thiols which may be condensed with alkylene oxides include alkanethiols containing at least two —SH groups such as 1,2-ethanedithiol, 1,2-propanedithiol, 1,3-propanedithiol, and 1,6-hexanedithiol; alkene thiols such as 2-butene-1,4-dithiol; and alkyne thiols such as 3-hexyne-1,6-dithiol.

Suitable amines which may be condensed with alkylene oxides include aromatic amines such as aniline, o-chloroaniline, p-aminoaniline, 1,5-diaminonaphthalene, methylene dianiline, the condensation products of aniline and formaldehyde, and 2,3- 2,6-, 3,4-, 2,5-, and 2,4-diaminotoluene; aliphatic amines such as methylamine, triisopropanolamine, ethylenediamine, 1,3-diaminopropane, 1,3-diaminobutane, and 1,4-diaminobutane.

Also, polyols containing ester groups can be employed in the subject invention. These polyols are prepared by the reaction of an alkylene oxide with an organic dicarboxylic acid anhydride and a compound containing reactive hydrogen atoms. A more comprehensive discussion of these polyols and their method of preparation can be found in U.S. Pat. Nos. 3,585,185; 3,639,541 and 3,639,542.

Polyols containing graft polymer dispersions may also be employed in the invention. These are prepared by the in situ polymerization, in the polyols listed below, of an ethylenically unsaturated monomer or a mixture of ethylenically unsaturated monomers. Representative ethylenically unsaturated monomers which may be employed in the present invention include butadiene, isoprene, 1,4-pentadiene, 1,6-hexadiene, 1,7-octadiene, styrene, α-methylstyrene, 2-methylstyrene, 3-methylstyrene and 4-methylstyrene, 2,4-dimethylstyrene, ethylstyrene, isopropylstyrene, butylstyrene, phenylstyrene, cyclohexylstyrene, benzylstyrene, and the like; substituted styrenes such as cyanostyrene, nitrostyrene, N,N-dimethylaminostyrene, acetoxystyrene, methyl 4-vinylbenzoate, phenoxystyrene, p-vinylphenyl oxide, and the like; the acrylic and substituted acrylic monomers such as acrylonitrile, acrylic acid, methacrylic acid, methyl acrylate, 2-hydroxyethyl acrylate, methyl methacrylate, cyclohexyl methacrylate, benzyl methacrylate, isopropyl methacrylate, octyl methacrylate, methacrylonitrile, ethyl α-ethoxyacrylate, methyl α-acetaminoacrtylate, butyl acrylate, 2-ethylhexyl acrylate, phenyl acrylate, phenyl methacrylate, N,N-dimethylacrylamide, N,N-dibenzylacrylamide, N-butylacrylamide, methacrylyl formamide, and the like; the vinyl esters, vinyl ethers, vinyl ketones, etc., such as vinyl acetate, vinyl butyrate, isopropenyl acetate, vinyl formate, vinyl acrylate, vinyl methacrylate, vinyl methoxyacetate, vinyl benzoate, vinyltoluene, vinylnaphthalene, vinyl methyl ether, vinyl ethyl ether, vinyl propyl ethers, vinyl butyl ethers, vinyl 2-ethylhexyl ether, vinyl phenyl ether, vinyl 2-methoxyethyl ether, methoxybutadiene, vinyl 2-butoxyethyl ether, 3,4-dihydro-1,2-pyran, 2-butoxy-2'-vinyloxy diethyl ether, vinyl methyl ketone, vinyl ethyl ketone, vinyl phosphonates such as vinyl phenyl ketone, vinyl ethyl sulfone, N-methyl-N-vinyl acetamide, N-vinyl-pyrrolidone, vinyl imidazole, divinyl sulfoxide, divinyl sulfone, sodium vinylsulfonate, methyl vinylsulfonate, N-vinyl pyrrole ,and the like; dimethyl fumarate, dimethyl maleate, maleic acid, crotonic acid, fumaric acid, itaconic acid, monomethyl itaconate, t-butylaminoethyl methacrylate, dimethylaminoethyl methacrylate, glycidyl acrylate, allyl alcohol, glycol monoesters of itaconic acid, vinyl pyridine, and the like Any of the known polymerizable monomers can be used and the compounds listed above ar illustrative and not restrictive of the monomers suitable for use in this invention. Preferably, the monomer is selected from the group consisting of acrylonitrile, styrene and mixtures thereof.

The amount of ethylenically unsaturated monomer employed in the polymerization reaction is generally from 25 percent to 60 percent, preferably from 30 percent to 45 percent, based on the total weight of the product. The polymerization occurs at a temperature between about 25° C. and 180° C., preferably from 80° C. to 135° C.

The unsaturated polyols or macromers which may be employed in preparing the graft polymer dispersions may be prepared by the reaction of any conventional polyol such as those described above with an organic compound having both ethylenic unsaturation and a hydroxyl, carboxyl, anhydride, isocyanate or epoxy group or they may be prepared by employing an organic compound having both ethylenic unsaturation and a hydroxyl, carboxyl, anhydride, or epoxy group as a reactant in the preparation of the conventional polyol. Representative of such organic compounds include unsaturated mono- and polycarboxylic acids and anhydrides such as maleic acid and anhydride, fumaric acid, crotonic acid and anhydride, propenyl succinic anhydride, acrylic acid, acryoyl chloride, hydroxy ethyl acrylate or methacrylate and halogenated maleic acids and anhydrides, unsaturated polyhydric alcohols such as 2-butene-1,4-diol, glycerol allyl ether, trimethylolpropane allyl ether, pentaerythritol allyl ether, pentaerythritol vinyl ether, pentaerythritol diallyl ether, and 1-butene-3,4-diol, unsaturated epoxides such as 1-vinylcyclohexene-3,4-epoxide, butadiene monoxide, vinyl glycidyl ether(1-vinyloxy-2,3-epoxy propane), glycidyl methacrylate and 3-allyloxypropylene oxide (allyl glycidyl ether). If a polycarboxylic acid or anhydride is employed to incorporate unsaturation into the polyols, it is preferable to react the unsaturated polyol with an alkylene oxide, preferably ethylene or propylene oxide, to replace the carboxyl groups with hydroxyl groups prior to employment in the present invention. The amount of alkylene oxide employed is such as to reduce the acid number of the unsaturated polyol to about 5 or less.

Illustrative polymerization initiators which may be employed are the well-known free radical types of vinyl polymerization initiators such as the peroxides, persulfates, perborates, percarbonates, azo compounds, etc. These include hydrogen peroxide, dibenzoyl peroxide, acetyl peroxide, benzoyl hydroperoxide, t-butyl hydroperoxide, di-t-butyl peroxide, lauroyl peroxide, butyryl peroxide, diisopropylbenzene hydroperoxide, cumene hydroperoxide, paramenthane hydroperoxide, diacetyl peroxide, di-α-cumyl peroxide, dipropyl peroxide, diisopropyl peroxide, isopropyl-t-butyl peroxide, butyl-t-butyl peroxide, difuroyl peroxide, bis(triphenylmethyl) peroxide, bis(p-methoxybenzoyl) peroxide, p-monomethoxybenzoyl peroxide, rubene peroxide, ascaridol, t-butyl peroxybenzoate, diethyl peroxyterephthalate, propyl hydroperoxide, isopropyl hydroperoxide, n-butyl hydroperoxide, t-butyl hydroperoxide, cyclohexyl hydroperoxide, trans-decalin hydroperoxide, α-methylbenzyl hydroperoxide, α-methyl-α-ethyl benzyl hydroperoxide, tetralin hydroperoxide, triphenylmethyl hydroperoxide, diphenylmethyl hydroperoxide, α,α'-azobis-(2-methyl heptonitrile), 1,1'-azo-bis (cyclohexane carbonitrile), 4,4'-azobis(4-cyanopentanoic acid), 2,2'-azobis(isobutyronitrile), 1-t-butylazo-1-cyanocyclohexane, persuccinic acid, diisopropyl peroxy dicarbonate, 2,2'-azobis(2,4-dimethylvaleronitrile), 2-t-butylazo-2-cyano-4-methoxy-4-methylpentane, 2,2'-azo-bis-2-methylbutanenitrile, 2-t-butylazo-2-cyanobutane, 1-t-amylazo-1-cyanocyclohexane, 2,2'-azobis(2,4-dimethyl-4-methoxyvaleronitrile, 2,2'-azobis-2-methylbutyronitrile, 2-t-butylazo-2-cyano-4-methylpentane, 2-t-butylazo-2-isobutyronitrile, to butylperoxyisopropyl carbonate and the like; a mixture of initiators may also be used. The preferred initiators are 2,2'-azobis(2-methylbutyronitrile), 2,2'-azobis(isobutyronitrile), 2,2'-azobis(2,4-dimethylvaleronitrile), 2-t-butylazo-2-cyano-4-methoxy-4-methyl pentane, 2-t-butylazo-2-cyano-4-methylpentane, 2-t-butylazo-2-cyano-butane and lauroyl peroxide. Generally, from about 0.1 percent to about 10 percent, preferably from about 1 percent to about 4 percent, by weight of initator based on the weight of the monomer will be employed in the process of the invention.

The polyurethane foams employed in the present invention are generally prepared by the reaction of a polyether polyol or a graft polymer dispersion in a polyol with an organic polyisocyanate in the presence of a blowing agent and optionally in the presence of additional poly-hydroxyl-containing components, chain-extending agents, catalysts, surface-active agents, stabilizers, dyes, fillers and pigments. Suitable processes for the preparation of cellular polyurethane plastics are disclosed in U.S. Reissue Pat. No. 24,514 together with suitable machinery to be used in conjunction therewith. When water is added as the blowing agent, corresponding quantities of excess isocyanate to react with the water and produce carbon dioxide may be used. It is possible to proceed with the preparation of the polyurethane plastics by a prepolymer technique wherein an excess of organic polyisocyanate is reacted in a first step with the polyol of the present invention to prepare a prepolymer having free isocyanate groups which is then reacted in a second step with water and/or additional polyol to prepare a foam. Alternatively, the components may be reacted in a single working step commonly known as the "one-shot" technique of preparing polyurethanes. Furthermore, instead of water, low boiling hydrocarbons such as pentane, hexane, heptane, pentene, and heptene; azo compounds such as azohexahydrobenzodinitrile; halogenated hydrocarbons such as dichlorodifluoromethane, trichlorofluoromethane, dichlorodifluoroethane, vinylidene chloride, and methylene chloride may be used as blowing agents.

Chain-extending agents which may be employed in the preparation of the polyurethane foams include those compounds having at least two functional groups bearing active hydrogen atoms such as water, hydrazine, primary and secondary diamines, amino alcohols, amino acids, hydroxy acids, glycols, or mixtures thereof. A preferred group of chain-extending agents includes water, ethylene glycol, 1,4-butanediol and primary and secondary diamines which react more readily with the prepolymer than does water such as phenylene diamine, 1,4-cyclohexane-bis-(methylamine), ethylenediamine, diethylenetriamine, N-(2-hydroxypropyl)ethylenediamine, N,N'-di(2-hydroxypropyl)ethylenediamine, piperazine, and 2-methylpiperazine.

Any suitable catalyst may be used including tertiary amines such as, for example, triethylenediamine, N-methylmorpholine, N-ethylmorpholine, diethylethanolamine, N-cocomorpholine, 1-methyl-4-dimethylaminoethylpiperazine, 3-methoxypropyldimethylamine, N,N,N'-trimethylisopropyl propylenediamine, 3-diethylaminopropyldiethylamine, dimethylbenzylamine, and the like. Other suitable catalysts are, for example, stannous chloride, dibutyltin di-2-ethyl hexanoate, stannous oxide, as well as other organometallic compounds such as are disclosed in U.S. Pat. No. 2,846,408.

A surface-active agent is generally necessary for production of high grade polyurethane foam according to the present invention, since in the absence of same, the foams collapse or contain very large uneven cells. Numerous surface-active agents have been found satisfactory. Nonionic surface active agents are preferred. Of these, the nonionic surface-active agents such as the well-known silicones have been found particularly desirable. Other surface-active agents which are operative, although not preferred, include polyethylene glycol ethers of long chain alcohols, tertiary amine or alkanolamine salts of long chain alkyl acid sulfate esters, alkyl sulfonic esters, and alkyl arylsulfonic acids.

Among the flame retardants which may be employed are: pentabromodiphenyl oxide, dibromopropanol, tris(β-chloropropyl)phosphate, 2,2-bis(bromoethyl) 1,3- propanediol, tetrakis(2-chloroethyl)ethylene diphosphate, tris(2,3 dibromopropyl)phosphate, tris(β-chloroethyl)phoshate, tris(1,2-dichloropropyl)phosphate, bis-(2-chloroethyl) 2chloroethylphosphonate, molybdenum trioxide, ammonium molybdate, ammonium phosphate, pentabromodiphenyloxide, tricresyl phosphate, hexabromocyclododecane, melamine, and dibromoethyldibromocyclohexane. The concentrations of flame retardant compounds which may be employed range from 5 to 25 parts per 100 parts of polyol mixture.

The following examples illustrate the nature of the invention. All parts are by weight unless otherwise stated. The abbreviations employed are as follows:

Isocyanate A is a polymeric diphenylmethane diisocyanate containing about 50 percent 2-ring content having about 35 percent 4,4'-MDI and 12.5 percent 2,4'-MDI.

Isocyanate B is a polymeric diphenylmethane diisocyanate containing about 50 percent 2-ring content having about 47 percent 4,4'-MDI and about 3 percent 2,4'-MDI.

Isocyanate C is 80 percent 2,4-, 2,6-toluene diisocyanate.

| Resin A is | Polyol A | 65 pbw |
|---|---|---|
| | Polyol B | 35 pbw |
| | Water | 3.91 pbw |
| | K$_2$CO$_3$ | 0.012 pbw |
| | Dabco 33LV | 0.6 pbw |
| | Dabco DM70 | 0.15 pbw |
| | Niax A107 | 0.3 pbw |
| | L-5309 | 2.0 pbw |

Blend A is 80 percent isocyanate C and 20 percent isocyanate of Example I.

Blend B is 80 percent isocyanate C and 20 percent isocyanate of Example II.

Blend C is 80 percent isocyanate C and 20 percent isocyanate of Example III.

Polyol A is a propylene oxide-ethylene oxide adduct of trimethylolpropane having a hydroxyl number of about 25 and containing 15 percent ethylene oxide.

Polyol B is a propylene oxide-ethylene oxide adduct of trimethylolpropane containing 13 percent ethylene oxide and 0.3 mole unsaturation per mole of polyol containing 31 weight percent 1:1 acrylonitrile:styrene having hydroxyl number of 24.

Dabco 33Lv is a catalyst sold by Air Products Corp. Dabco DM70 is a catalyst sold by Air Products Corp. Niax A107 is a catalyst sold by Union Carbide Corp. L-5390 is a silicone surfactant sold by Union Carbide Corp.

EXAMPLES 1-7

The Examples of 1-7 were prepared by reacting the tabulated isocyanates in the quantities specified under the conditions listed in a suitable reactor. The resulting isocyanate properties are as listed.

TABLE I

| | Example | | | | | | |
|---|---|---|---|---|---|---|---|
| | 1 | 2 | 3 | 4 | 5 | 6 | 7 |
| Isocyanate A | 99.6 | — | — | — | — | — | — |
| Isocyanate B | — | 99.6 | 99.8 | 99.6 | 94.62 | 94.62 | 99.2 |
| Isocyanate C | — | — | — | — | 4.98 | 4.98 | — |
| Water, % | 0.4 | 0.4 | 0.2 | 0.4 | 0.4 | 0.4 | 0.8 |
| Addition time, hr. | 2.0 | 2.0 | 2.0 | 2.0 | 1.0 | 1.0 | 2 to 3 |
| Addition temperature, °C. | 70–75 | 70–75 | 70–75 | 70–75 | 75–80 | 70–75 | 70–80 |
| Reaction time, hr. | 4.0 | 4.0 | 4.0 | 12.0 | 2–3 | 5.0 | 4.0 |
| Reaction temperature, °C. | 130–135 | 130–135 | 130–135 | 80 | 120–130 | 80 | 135 |
| NCO, % | 28.2 | 28.6 | 29.7 | 28.7 | 29.4 | 30.1 | 26.0 |
| Viscosity, cps/25° C. | 4520 | 2688 | 704 | 1696 | 1080 | 800 | 195,000 |

EXAMPLES 8-12

The polyurethane foams listed in Table 11 were prepared employing an Admiral III low pressure unit. The machine parameters are as follows:

TABLE II

| | Examples | | | | |
|---|---|---|---|---|---|
| | 8 | 9 | 10 | 11 | 12 |
| Formulation, pbw | | | | | |
| Resin A | 100 | 100 | 100 | 100 | 100 |
| Isocyanate of Example 1 (Index) | (102) | — | — | — | — |
| Blend A (Index) | — | (102) | — | — | — |
| Isocyanate of Example 2 (Index) | — | — | (102) | — | — |
| Blend C (Index) | — | — | — | (102) | — |
| Blend B (Index) | — | — | — | — | (102) |
| Physical Properties | | | | | |
| Density, kg/m$^3$ (free rise) | 28.03 | 31.6 | 29.6 | 31.7 | 31.9 |
| Density, kg/m$^3$ (molded, core) | 32.5 | 34.3 | 36.0 | 33.5 | 36.5 |
| Tensile, kPa | 136.5 | 168.2 | 168.2 | 164.1 | 198.6 |
| Elongation, % | 139 | 123 | 130 | 136 | 143 |
| Tear, N/M 8.3 mm/sec. | 210 | 228 | 210 | 210 | 210 |
| IRGL (mm) | | | | | |
| at 4.5 N | 122 | 122 | 122 | 128 | 116 |
| at 110 N | 81.3 | 91.7 | 86.1 | 100.6 | 81.3 |
| at 220 N | 53.3 | 62.7 | 56.6 | 70.1 | 56.4 |
| ILD 4.5 N/320 cm$^2$ | | | | | |
| sample thickness, mm | 121.7 | 122.2 | 121.4 | 127.5 | 115.8 |
| 25% | 0.84 | 1.06 | 0.95 | 1.21 | 0.93 |
| 65% | 2.71 | 3.72 | 3.25 | 3.96 | 3.68 |
| 25% return | 0.68 | 0.86 | 0.76 | 0.98 | 0.76 |
| Sag factor | 3.23 | 3.50 | 3.41 | 3.28 | 3.94 |
| Recovery, % | 80.5 | 81.2 | 80.0 | 81.2 | 81.5 |
| Compression set, 75% | 20.8 | 14.9 | 23.1 | 16.9 | 14.2 |
| Humid aged 3 hrs. at | | | | | |
| CLD, % of original 50% | 94.9 | 88.2 | 91.8 | 85.8 | 90.4 |
| Compression set, 75% | 22.2 | 17.2 | 23.3 | 20.8 | 21.3 |
| Heat aged 22 hrs. at | | | | | |
| tensile strength, kPa | 138.6 | 142.7 | 157.9 | 125.5 | 156.5 |
| % of original | 102 | 84.8 | 93.8 | 76.5 | 78.8 |
| Pad weight, g | 1110 | 1150 | 1151 | 1155 | 1145 |
| Air flow, dm$^3$/sec. at 12.7 mm H$_2$O | 38.2 | 50.5 | 23.6 | 55.2 | 60.4 |
| MVSS 302 Flame Test | | | | | |
| Avg. distance burned, mm | 22.9 | 43.2 | 17.8 | 20.3 | 33.0 |
| Burning time, sec. | 14 | 28 | 11 | 11 | 22 |

EXAMPLES 13-14

The indicated amount and type of polyisocyanate was added to a flask equipped with a stirrer and heating mantle. The isocyanate was heated to 70° C. and t-butanol was added dropwise. After the addition of the t-butanol is completed, the reactor contents were gradually heated to 50° C. and maintained at that temperature for four hours. The products were then cooled rapidly to room temperature.

TABLE III

|  | Example 13 | Example 14 |
| --- | --- | --- |
| Isocyanate C | 297 | — |
| Isocyanate B | — | 298.8 |
| t-Butanol | 3 | 1.2 |
| Reaction time, hr. | 4 | 4 |
| Reaction temperature, °C. | 150–2 | 150–2 |
| NCO, % | 45.7 | 30.2 |
| Viscosity, cps 25° C. | 5 | — |

The embodiments of the invention in which an exclusive property or privilege is claimed are defined as follows:

1. A process of producing a flexible polyurethane foam having improved air flow and compression set consisting of reacting a polyol having an equivalent weight from 1000 to 3000 and a urea-biuret modified polyisocyanate mixture in the presence of a blowing agent and a urethane catalyst wherein said polyisocyanate mixture is composed of toluene diisocyanate and urea-biuret modified polymeric diphenylmethane diisocyanate.

2. The process of claim 1 wherein the polyisocyanate mixture contains from about 50 weight percent to about 90 weight percent toluene diisocyanate based on the total weight of the mixture.

3. The process of claim 1 wherein the polyisocyanate mixture contains about 80 weight percent toluene diisocyanate based on the total weight of the mixture.

4. The process of claim 1 wherein the urea-biuret modified polymeric diphenylmethane diisocyanate is prepared by reacting a compound selected from the group consisting of t-butanol and water with the polymeric diphenylmethane diisocyanate.

5. The process of claim 4 wherein the concentration of water or t-butanol employed is from about 0.2 weight percent to about 1 weight percent based on the weight of the diisocyanate.

6. The process of claim 4 wherein the diisocyanate is reacted with water or t-butanol at temperatures from about 80° C. to about 135° C.

7. A process of producing a flexible polyurethane foam having improved air flow and compression set consisting of reacting a polyol having an equivalent weight from 1000 to 3000 and a urea-biuret modified polyisocyanate mixture in the presence of a blowing agent and a urethane catalyst wherein said polyisocyanate mixture is composed of urea-biuret modified toluene diisocyanate and polymeric diphenylmethane diisocyanate.

8. The process of claim 7 wherein the polyisocyanate mixture contains from about 50 weight percent to about 90 weight percent toluene diisocyanate based on the total weight of the mixture.

9. The process of claim 7 wherein the polyisocyanate mixture contains about 80 weight percent toluene diisocyanate based on the total weight of the mixture.

10. The process of claim 7 wherein the urea-biuret modified toluenediisocyanate is prepared by reacting a compound selected from the group consisting of t-butanol and water with the toluene diisocyanate.

11. The product of claim 1.
12. The product of claim 2.
13. The product of claim 3.
14. The product of claim 7.
15. The product of claim 8.
16. The product of claim 9.

17. A process of producing a flexible polyurethane foam having improved air flow and compression set consisting of reacting a polyol having an equivlent weight from 1000 to 3000 and a urea-biuret modified polyisocyanate mixture in the presence of a blowing agent and a urethane catalyst wherein said polyisocyante mixture is composed of urea-biuret modified toluene diisocyanate and urea-biuret modified polymeric diphenylmethane diisocyanate.

18. The process of claim 17 wherein the polyisocyanate mixture contains from about 50 weight percent to about weight percent toluene diisocyanate based on the total weight of the mixture.

19. The process of claim 17 wherein the polyisocyanate mixture contains about 80 weight percent toluene diisocyanate based on the total weight of the mixture.

20. The process of claim 17 wherein the ureabiuret modified polyisocyanate mixture is prepared by reacting a compound selected from the group consisting of tbutanol and water with a mixture of toluene diisocyanate and polymeric diphenylmethane diisocyanate.

21. The process of claim 20 wherein the concentration of water or t-butanol employed is from about 0.2 weight percent to about 1 weight percent based on the weight of the diisocyanate.

22. The process of claim 19 wherein the mixture is reacted with water or t-butanol at temperatures from about 80° C. to about 135° C.

* * * * *